United States Patent
Murayama et al.

(10) Patent No.: US 6,565,964 B1
(45) Date of Patent: May 20, 2003

(54) MAGNETIC RECORDING MEDIUM

(75) Inventors: Yuichiro Murayama, Odawara (JP); Katsuhiko Meguro, Odawara (JP); Hiroshi Hashimoto, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/094,496

(22) Filed: Jun. 10, 1998

(30) Foreign Application Priority Data

Jun. 12, 1997 (JP) .............................................. 9-155382
Jun. 12, 1997 (JP) .............................................. 9-155383

(51) Int. Cl.$^7$ .............................................. G11B 5/702
(52) U.S. Cl. ............. 428/323; 428/425.9; 428/694 BU; 428/694 BY; 428/694 BL
(58) Field of Search .............................. 428/323, 694 B, 428/694 BC, 694 BU, 694 BL, 694 BN, 694 BA, 694 BM, 425.9, 694 BY

(56) References Cited

U.S. PATENT DOCUMENTS

| | | | | |
|---|---|---|---|---|
| 4,368,238 A | * | 1/1983 | Somezawa et al. | 428/413 |
| 4,795,672 A | * | 1/1989 | Takeda et al. | 428/216 |
| 5,371,166 A | * | 12/1994 | Farkas et al. | 528/71 |
| 5,578,376 A | * | 11/1996 | Hashimoto et al. | 428/425.9 |
| 5,637,390 A | * | 6/1997 | Isobe et al. | 428/323 |
| 5,700,541 A | * | 12/1997 | Okita et al. | 428/65.4 |
| 5,702,821 A | * | 12/1997 | Murayama et al. | 428/425.9 |
| 5,747,157 A | * | 5/1998 | Hashimoto et al. | 428/332 |
| 5,795,645 A | * | 8/1998 | Takahashi et al. | 428/216 |
| 5,908,691 A | * | 6/1999 | Murayama et al. | 428/323 |
| 5,932,340 A | * | 8/1999 | Sawaguchi et al. | 428/323 |
| 6,063,500 A | * | 5/2000 | Kurose et al. | 428/425.9 |
| 6,111,049 A | * | 8/2000 | Sendijarevic et al. | 528/65 |

OTHER PUBLICATIONS

Aldrich Chemicals Catelog 2000–2001, pp. 1350–1351.*

* cited by examiner

Primary Examiner—Paul Thibodeau
Assistant Examiner—Kevin M. Bernatz
(74) Attorney, Agent, or Firm—Sughrue Mion, PLLC

(57) ABSTRACT

The present invention provides a magnetic recording medium, which comprises at least one magnetic layer where ferromagnetic powder and a binder are dispersed, and said magnetic layer is placed on a non-magnetic support, whereby said binder comprises a polyurethane resin obtained through reaction of polytetramethylene glycol and short-chain diol having cyclic structure or short-chain diol having a branched side chain containing two or more carbon atoms, said polytetramethylene glycol is contained in said polyurethane resin in an amount of 35 to 60 weight %, said short-chain diol is contained in said polyurethane resin in an amount of 10 to 40 weight %, and glass transition temperature of said polyurethane resin is within the range of 30° C. to 120° C.

4 Claims, No Drawings

MAGNETIC RECORDING MEDIUM

BACKGROUND OF THE INVENTION

The present invention relates to a magnetic recording medium, which has high electromagnetic transfer characteristics and high durability and comprises a magnetic layer having ferromagnetic powder and a binder dispersed in it, and the magnetic layer is placed on a non-magnetic support.

The magnetic recording medium is widely used in such applications as recording tape, video tape, floppy disk, etc. The magnetic recording medium comprises a magnetic layer having ferromagnetic powder and a binder dispersed in it, and the magnetic layer is laminated on a non-magnetic support.

The magnetic recording medium must be at high level in such characteristics as electromagnetic transfer characteristics, running durability, and running performance. Specifically, an audio tape for reproducing musical sound must have an ability to reproduce original sound with higher quality. A video tape must have high electromagnetic transfer characteristics such as high ability to reproduce original image or picture. The magnetic recording medium used in storage device of a computer must be able to perform high density recording with high reliability.

In addition to high electromagnetic transfer characteristics as described above, the magnetic recording medium must have good running durability. To ensure good running durability, abrasive material and lubricant are generally added in the magnetic layer.

Because of sliding and contact between the medium and a magnetic head in the device where the magnetic recording medium is used, low molecular components in the binder of the magnetic recording medium tend to migrate toward surface of the magnetic layer, and this often causes problem of magnetic head contamination when these components are attached on the magnetic head.

Contamination of the magnetic head causes deterioration of electromagnetic transfer characteristics. In particular, in the device for high density recording, number of revolutions of the magnetic head is high. In a digital video tape recorder, number of revolutions of the magnetic head is as high as 9,600 rpm, and this is much higher compared with 1,800 rpm of an analog video tape recorder for household use, and 5,000 rpm of a video tape recorder for business use. Sliding speed between the magnetic recording medium and the magnetic head is getting increasingly higher, and the magnetic head and the thin film head are designed in more and more compact size, and there are strong demands to minimize and to improve the problems of magnetic head contamination caused by components of the magnetic recording medium. Also, the magnetic recording medium used for high density recording to replace floppy disk must have high strength and high reliability.

To solve the above problems and to improve property, hard binder is used to increase hardness of the magnetic layer.

For example, according to JP-A-01263927, there are provided a first and a second magnetic layers, and a polyurethane resin comprising polyether polyol, which is selected from polyethylene glycol, polypropylene glycol or polytetramethylene glycol, is used in the first magnetic layer. However, the polyurethane resin is deposited on the surface of the second magnetic layer, and this leads to higher friction coefficient during running operation and to poor durability.

Further, the polytetramethylene glycol given in the example is contained in an amount of 75 weight % or more and has low strength, and there is no description on simultaneous use with a short-chain diol.

JP-B-8260531 describes a polyurethane resin comprising polyol, which contains polytetramethylene glycol and polycaprolactone. The content of the short-chain diol is about 15 weight % when calculated from the example, and glass transition temperature (Tg) of the polyurethane resin is in the range of −10° C. to +20° C. This is lower than that of the product according to the present invention. The strength of the coating film is low, and this leads to poor durability.

Similarly, JP-A-61190717 describes a polyurethane resin, which comprises polyol containing polytetramethylene glycol and polycaprolactone and a low molecular diol of glycol ester of monohydrocarboxylic acid. This aims to obtain a product with high calender workability, and coating film is often fluidized and has low durability. There is no description on glass transition temperature (Tg). Tg of the polyurethane resin given in the example is determined as about −30° C. Accordingly, the strength of the coating film is low, and durability is not satisfactory.

JP-A-08147670 describes a polyurethane resin, which comprises polyol and short-chain diol of 5 mol % or less or diamine and diisocyanate. The content of the polyol is 0 to 5 mol %, and the content of ether is low even when polytetramethylene glycol is used. Thus, it has low adsorbing property to the magnetic support, and dispersion property is not sufficient.

JP-A-08293115 (U.S. Pat. No. 5,702,821) describes the use of a polyurethane resin, which comprises a short-chain diol having cyclic structure in an amount of 17 to 40 weight % and a polyol having ether content of 1 to 5 mmol/g in the polyurethane resin in an amount of 10 to 50 weight %, but both dispersion property and smoothness are not sufficient.

As described above, the conventional type polyurethane resin used as a binder for the magnetic recording medium lacks flexibility and does not meet the requirements such as high dispersion property, smoothness and high glass transition temperature even when it is manufactured using polytetramethylene glycol and short-chain diol.

SUMMARY OF THE INVENTION

The present invention provides magnetic recording medium, which comprises at least one magnetic layer where ferromagnetic powder and a binder are dispersed, and the magnetic layer is placed on a non-magnetic support, whereby the binder comprises a polyurethane resin obtained through reaction of polytetramethylene glycol and short-chain diol having cyclic structure or short-chain diol having a branched side chain containing two or more carbon atoms, the polytetramethylene glycol is contained in the polyurethane resin in an amount of 35 to 60 weight %, the short-chain diol is contained in the polyurethane resin in an amount of 10 to 40 weight %, and glass transition temperature of the polyurethane resin is within the range of 30° C. to 120° C.

Also, the invention provides the magnetic recording medium as described above, wherein the short-chain diol having the cyclic structure is at least one of a group of bisphenol A, alkylene oxide addition product of bisphenol A, hydrogenated bisphenol A, alkylene oxide addition product of hydrogenated bisphenol A, cyclohexanedimethanol, or cyclohexane diol.

Further, the invention provides the magnetic recording medium as described above, wherein the short-chain diol having a branched side chain containing two or more carbon atoms is at least one selected from a group of 2-ethyl-1,3-hexanediol, 2-ethyl-2-butyl-1,3-propanediol, 2,2-diethyl-1,3-propanediol, 2-ethyl-2-butyl-1,3-propanediol, 2-ethyl-2-propyl-1,3-propanediol, 2,2-dipropyl-1,3-propanediol, 2-methyl-2-propyl-1,3-propanediol, and 2,2-dibutyl-1,3-propanediol.

Also, the present invention provides a magnetic recording medium, which comprises a lower layer having ferromagnetic powder or inorganic powder and a binder dispersed in it and being placed on a non-magnetic support, and at least one layer of magnetic layers where ferromagnetic powder and a binder are dispersed, whereby at least one of the binder in the lower layer or in the magnetic layer contains the polyurethane resin described in claim 1.

Also, the invention provides the magnetic recording medium as described above, wherein the ferromagnetic powder comprises iron as main component, and the iron contains yttrium with Y/Fe ratio of 0.5 to 10 atomic %.

DESCRIPTION OF THE PREFERRED EMBODIMENTS

In the magnetic recording medium of the present invention, polyurethane resin having polytetramethylene glycol as a long-chain diol component is used as a binder in the magnetic layer or in the lower layer, and the content of the polytetramethylene glycol is decreased. By adequately combining the short-chain diol having cyclic structure, the short-chain diol having a branched side chain containing two or more carbon atoms, and an organic diisocyanate, polytetramethylene glycol having high breaking extension property and high glass transition temperature can be produced. As a result, a magnetic recording medium having strong and tough coating film capable to resist high-speed sliding can be prepared.

At the same time, by improving dispersion property of the ferromagnetic powder and the non-magnetic powder, it is possible to have the coating film with smooth surface and to produce the magnetic recording medium having high electromagnetic transfer characteristics.

Further, when it is applied in the lower layer of the multi-layer tape, the polyurethane is scarcely deposited on the surface of the upper layer, and durability can be improved.

As the short-chain diol having cyclic structure used as raw material for the polyurethane resin contained in the binder of the magnetic recording medium of the present invention, the following substances may be used: diol such as bisphenol A, hydrogenated bisphenol A, bisphenol S, bisphenol P, and ethylene oxide or propylene oxide of the above compound, or mixed addition product of ethylene oxide propylene oxide, diol such as cyclohexane dimethanol, cyclohexane diol, etc. or diol obtained by adding ethylene oxide, propylene oxide, or butylene oxide to dibasic acid such as phthalic acid, sulfo-isophthalic acid, etc.

More preferably, hydrogenated bisphenol A or ethylene oxide, or propylene oxide addition product of the hydrogenated bisphenol A may be used.

It is preferable that the short-chain diol having cyclic structure is contained in the polyurethane resin in an amount of 10 to 40 weight %. If it is contained in an amount of lower than 10 weight %, dynamic strength is decreased, leading to poor durability. If it is contained in an amount of more than 40 weight %, solubility to solvent is decreased, resulting in lower dispersion property. Also, the coating film becomes fragile, and durability is decreased.

It is preferable that the short-chain diol having a branched side chain containing two or more carbon atoms is contained in the polyurethane resin in the present invention in an amount of 10 to 40 weight %. If it is contained in an amount of lower than 10 weight %, dynamic strength is decreased, leading to poor durability. If it is contained in an amount of more than 40 weight %, solubility in solvent decreases, and dispersion property is also decreased.

As the short chain diol having a branched side chain containing two or more carbon atoms, the following substances may be used: 2-ethyl-1,3-hexanediol, 2-ethyl-2-methyl-1,3-propanediol, 2-butyl-1,3-hexanediol, 2-normalbutyl-2-ethyl-1,3-propanediol, 3-ethyl-1,5-pentanediol, 3-butyl-1,5-pentanediol, 3-propyl-1,5-pentanediol, 2,2-diethyl-1,3-propanediol, 3-octyl-1,5-pentanediol, 3-myristyl-1,5-pentanediol, 3-stearyl-1,5-pentanediol, 2-ethyl-1,3-propanediol, 2-ethyl-1,5-pentanediol, 2-ethyl-1,6-hexanediol, 2-ethyl-2-butyl-1,3-propanediol, 2-ethyl-2-propyl-1,3-propanediol, 2,2-dipropyl-1,3-propanediol, 2-methyl-2-propyl-1,3-propanediol, or 2,2-dibutyl-1,3-propanediol.

Among these substances, it is more preferable to use 2-ethyl-1,3-hexanediol, 2-ethyl-2-butyl-1,3-propanediol, 2,2-diethyl-1,3-propanediol, 2-ethyl-2-butyl-1,3-propanediol, 2-ethyl-2-propyl-1,3-propanediol, 2,2-dipropyl-1,3-propanediol, 2-methyl-2-propyl-1,3-propanediol, or 2,2-dibutyl-1,3-propanediol. These substances can be expressed by the following formulae:

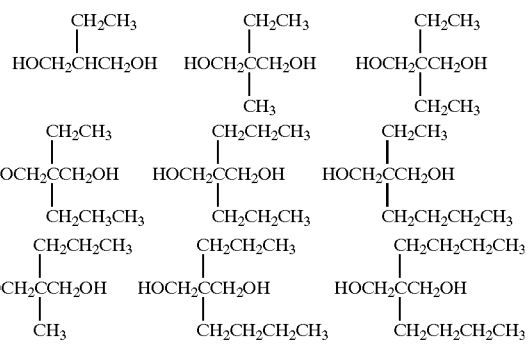

Among these substances, it is more preferable to use 2-ethyl-2-butyl-1,3-propanediol, 2,2-diethyl-1,3-propanediol, or 2,2-dibutyl-1,3-propanediol.

The number of the carbon atoms in the branched carbon chain is preferably 2 to 10, or more preferably 2 to 6. If it is lower than 2, solubility in solvent is lowered, and dispersion property is decreased. If it is more than 10, solubility in solvent is also decreased, and the dispersion property is lowered.

The polytetramethylene glycol used as the long-chain polyol is contained in the polyurethane resin preferably in an amount of 35 to 60 weight %, or more preferably in 40 to 50 weight %. If its content is lower than 35 weight %, solubility in solvent is decreased and dispersion property is also decreased. If its content is more than 60 weight %, the strength of the coating film is decreased, leading to poor durability. Weight average molecular weight of the polytetramethylene glycol is preferably 500 to 5,000, or more preferably 1,000 to 3,000.

As the organic diisocyanate used together with the polytetramethylene glycol, the short-chain diol having cyclic structure, or the short-chain diol having the branched side chain, the following compounds may be used: aromatic diisocyanate such as 2,4-tolylene-diisocyanate, 2,6-tolylene-diisocyanate, xylene-1,4-diisocyanate, xylene-1,3-diisocyanate, 4-4'-diphenylmethane-diisocyanate, 4,4-diphenylether-diisocyanate, 2-nitrodiphenyl-4,4'-diisocyanate, 2,2'-diphenylpropane-4,4'-diisocyanate, 4,4'-diphenylpropane-diisocyanate, m-phenylene-diisocyanate, p-phenylene-diisocyanate, naphthylene-1,4-diisocyanate, naphthylene-1,5-diisocyanate, 3,3'-dimethoxydiphenyl-4,4'-diisocyanate, etc., aliphatic diisocyanate such as tetramethylene diisocyanate, hexamethylene diisocyanate, lysine diisocyanate, etc. or cycloaliphatic diisocyanate such as isophorone-diisocyanate, hydrogenated tolylene-diisocyanate, hydrogenated diphenylmethane diisocyanate, etc.

It is preferable to use aromatic diisocyanate, or more preferably 4,4-diphenylmethane diisocyanate, 2,2-tolylene diisocyanate, p-phenylene diisocyanate, isophorone diisocyanate.

Weight average molecular weight (Mw) of the polyurethane resin used in the magnetic recording medium of the present invention is preferably 30,000 to 70,000, or more preferably 40,000 to 60,000. If it is less than 30,000, strength of the coating film is decreased, leading to poor durability. If it is more than 70,000, solubility in solvent is lowered, leading to poor dispersion property.

Glass transition temperature (Tg) of the polyurethane resin used in the magnetic recording medium of the present invention is preferably 30° C. to 120° C., or more preferably 50° C. to 90° C. If it is lower than 30° C., strength of the coating film is decreased at high temperature, thus resulting in lower durability and storage property. If it is higher than 120° C., calender workability is decreased, leading to poor electromagnetic transfer characteristics.

It is preferable that the polyurethane resin contains a polar group. As the polar group of the polyurethane, —$SO_3M$, —$OSO_3M$, —$PO_3M_2$, or —COOM are preferably used, or more preferably, —$SO_3M$ or $OSO_3M$. It is preferable that the content of the polar group is $1\times10^{-5}$ eq/g to $2\times10^{-4}$ eq/g. If it is less than $1\times10^{-5}$ eq/g, adsorption to magnetic substance becomes insufficient, and this leads to poor dispersion property. If it is more than $2\times10^{-4}$ eq/g, solubility in solvent is decreased, leading to poor dispersion property.

The content of OH groups in the polyurethane resin exerts influence on physical property of the binder to be obtained. Preferably, 2 to 20 OH groups are contained per molecule in the polyurethane resin, or more preferably 3 to 15 groups per molecule.

If it is less than 3 groups per molecule, reactivity with isocyanate curing agent is decreased, and this reduces the strength of the coating film and leads to poor durability. On the other hand, if it is 15 groups or more per molecule, solubility in solvent decreases, leading to poor dispersion property.

As the ferromagnetic powder, Fe, Fe—Co, Fe—Ni, or Co—Ni—Fe containing yttrium may be used. The content of yttrium in the ferromagnetic powder is preferably such that the ratio of yttrium atoms to iron atoms (Y/Fe) is 0.5 to 20 atomic %, or more preferably 5 to 10 atomic %. If it is lower than 0.5 atomic %, it is not possible to have ferromagnetic powder with higher σ s value. As a result, magnetic characteristics decrease, leading to poor electromagnetic transfer characteristics. If it is higher than 20 atomic %, the iron content is decreased. This leads to lower magnetic characteristics and poor electromagnetic transfer characteristics. Further, any of the following elements may be contained within the range of not more than 20 atomic % to 100 atomic % of iron: aluminum, silicon, sulfur, scandium, titanium, vanadium, chromium, manganese, copper, zinc, molybdenum, rhodium, palladium, gold, tin, antimony, boron, barium, tantalum, tungsten, rhenium, gold, lead, phosphorus, lanthanum, cerium, praseodymium, neodymium, tellurium, bismuth, etc. Also, the ferromagnetic metal powder may contain small quantity of water, hydroxide or oxide.

In the ferromagnetic powder of the present invention, in addition to yttrium, elements such as neodymium, samarium, praseodymium, lanthanum, etc. may be introduced. These can be introduced using chloride such as yttrium chloride, neodymium chloride, samarium chloride, praseodymium chloride, lanthanum chloride, etc. or nitrate such as neodymium nitrate, gadolinium nitrate, etc. Two or more types of these compounds may be simultaneously used.

There is no special restriction on the shape of the ferromagnetic powder. In general, the ferromagnetic powder in needle-like, particulate, cubic, grain-like or planar shape may be used. In particular, it is preferable to use needle-like ferromagnetic powder.

The resin components, the curing agent, and the ferromagnetic powder as given above are kneaded and dispersed together with methylethylketone, dioxane, cyclohexanone, ethyl acetate, etc. used in the preparation of magnetic coating material, and a magnetic coating material is prepared. The kneading and dispersing may be performed according to the procedure commonly known.

The magnetic coating material may contain, in addition to the components given above, abrasive material such as α—$Al_2O_3$, $Cr_2O_3$, etc., anti-static agent such as carbon black, lubricant such as fatty acid, fatty acid ester, silicone oil, etc., or additive or filling agent normally used such as dispersing agent.

Next, description will be given on the lower non-magnetic layer or the lower magnetic layer in case the medium of the present invention is designed in multi-layer structure. Inorganic powder in the lower layer in the present invention may be magnetic powder or non-magnetic powder. For example, in case of non-magnetic powder, inorganic powder can be selected from inorganic compound such as metal oxide, metal carbonate, metal sulfate, metal nitride, metal carbide, metal sulfide, etc. As the inorganic compounds, the following substances are used in combination or alone: For example, α-alumina with alpha ratio of 90%–100% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, etc. In particular, it is preferable to use titanium dioxide, zinc oxide, iron oxide or barium sulfate, or more preferably titanium dioxide. Average particle size of the non-magnetic powder is preferably in the range of 0.005 to 2 μm. When necessary, non-magnetic powder with different average particle sizes may be mixed together or similar effect can be provided with single type of non-magnetic powder by widening the particle size distribution. In particular, it is preferable that average particle size of the non-magnetic powder is 0.01 to 0.2 μm. It is preferable that pH value of the non-magnetic powder is within the range of 6 to 9. Specific surface area of the non-magnetic powder is preferably 1 to 100 $m^2$/g, or more preferably 5 to 50 $m^2$/g, or most preferably 7 to 40 $m^2$/g. Crystallite size of the non-magnetic powder is preferably 0.01 to 2 μm. Oil absorption using DBP is preferably 5 to 100 ml/100 g, or more preferably 10 to 80 ml/100 g, or most preferably 20 to 60 ml/100 g. Specific gravity is preferably 1 to 12, or more preferably 3 to 6. The shape may be any of needle-like, spherical, polyhedron, or planar shape.

It is preferable that surface of the non-magnetic powder is processed by surface treatment using $Al_2O_3$, $SiO_2$, $TiO_2$, $ZrO_2$, $SnO_2$, $Sb_2O_3$, or ZnO. To ensure better dispersion property, it is preferable to use $Al_2O_3$, $SiO_2$, $TiO_2$ or $ZrO_2$, or more preferably $Al_2O_3$, $SiO_2$ or $ZrO_2$. These substances may be used in combination or alone. According to each individual purpose, coprecipitated surface treatment layer may be used, or a method to treat the surface layer using silica after treating with alumina, or a method reversing this procedure may be adopted. The surface treatment layer may be porous according to the purpose. In general, it is preferably homogeneous and dense.

By mixing carbon black in the lower layer, it is possible to decrease the value of Rs as the effect already known and to attain micro Vickers hardness as desired. For this purpose, furnace black for rubber, thermal black for rubber, carbon black for color, acetylene black, etc. may be used.

Specific surface area of the carbon black is preferably 100 to 500 $m^2/g$, or more preferably 150 to 400 $m^2/g$. DBP oil absorption is preferably 20 to 500 ml/100 g, or more preferably 30 to 400 ml/100 g. Average particle size of the carbon black is preferably 5 to 80 μm, or more preferably 10 to 50 μm, or most preferably 10 to 40 μm. In the carbon black, it is preferable that pH value is 2 to 10, moisture content is 0.1 to 10%, and tap density is 0.1 to 1 g/ml. Concrete examples of the carbon black to be used in the present invention are as follows: Blackpearls 2000, 1300, 1000, 900, 800, 880, 700, and Vulcan XC-72 (manufactured by Cabot), #3050B, #3150B, #3250B, #3750B, #3950B, #950, #650B, #970B, #850B, and MA-600 (manufactured by Mitsubishi Chemical Industry Co., Ltd.), Conductex SC, Raven 8800, 8000, 7000, 5750, 5250, 3500, 2100, 2000, 1800, 1500, 1255, and 1250 (manufactured by Columbia Carbon Co.), and Ketchenblack EC (manufactured by Akzo).

In the lower layer of the present invention, ferromagnetic powder may also be used. As the ferromagnetic powder, an alloy having $\gamma$-$Fe_2O_3$, Co-denatured $\gamma$-$Fe_2O_3$, or $\alpha$-Fe as principal component, or $CrO_2$ may be used. In particular, it is preferable to use Co-denatured $\gamma$-$Fe_2O_3$. The ferromagnetic powder used in the lower layer of the present invention has preferably composition and performance characteristics similar to those of the ferromagnetic powder used in the upper magnetic layer. However, the performance characteristics may be varied in the upper and the lower layers as already known according to each individual purpose. For example, to improve long wavelength recording characteristics, it is desirable to set the value of Hc of the lower magnetic layer to a value lower than that of the upper magnetic layer. Also, it is more effective to set the value of Br in the lower magnetic layer to a value higher than that of the upper magnetic layer. Further, advantages can be provided by adopting a multi-layer structure as already known.

As binder, lubricant, dispersing agent, additive, solvent, dispersing method, etc. of the lower magnetic layer or the lower non-magnetic layer, those for the magnetic layer can be applied. In particular, for quantity and type of binder, and quantity and type of additive and dispersing agent, the technique already known for the magnetic layer may be applied.

The magnetic coating material prepared from the above materials is coated on the non-magnetic support, and a magnetic layer is formed.

As the non-magnetic support used in the present invention, polyethylene naphthalate, polyethylene terephthalate, polyamide, polyimide, polyamideimide, aromatic polyamide, polybenzoxydazole, etc. processed by biaxial stretching may be used. More preferably, polyethylene naphthalate or aromatic polyamide may be used. These non-magnetic supports may be processed in advance by corona discharge, plasma treatment, treatment to make more easily adhesive, heat treatment, etc. The non-magnetic support used in the present invention has preferably such surface smoothness that average surface roughness at central line is in the range of 0.1 to 20 nm under cut-off value of 0.25 mm, or more preferably in the range of 1 to 10 nm. It is also preferable that the non-magnetic support not only has lower average surface roughness at central line but also has no excessive projection of more than 1 μm.

The magnetic recording medium of the present invention can be manufactured, for example, by the following method: On the surface of a non-magnetic support under running condition, a coating solution for the magnetic layer is coated so that thickness of the magnetic layer after drying will be within the range of 0.05 to 3.0 μm, or more preferably 0.07 to 1.0 μm. In this case, a plurality of magnetic coating materials may be coated in multiple layers sequentially or at the same time.

On the surface (where the coating material is not coated) of the non-magnetic support used in the present invention, a back-coating layer (backing layer) may be provided. The back-coating layer is a layer, which is produced by coating a coating material to form back-coating layer (i.e. a coating material where particulate components such as abrasive material, anti-static material, etc. and the binder are dispersed in an organic solvent) on the uncoated surface of the non-magnetic support.

An adhesive layer may be provided on the surface of the non-magnetic support coated with the magnetic coating material and also with the coating material to form back-coating layer.

The coating layer coated with the magnetic coating material is dried after magnetic field orientation processing is performed on the ferromagnetic powder contained in the coating layer of the magnetic coating material.

After it has been dried as described above, surface smoothening treatment is carried out on the coating layer. For the surface smoothening treatment, super calender roll is used, for example. By the surface smoothening treatment, the holes generated due to removal of the solvent during drying are eliminated, and filling ratio of the ferromagnetic powder in the magnetic layer is improved. This makes it possible to obtain a magnetic recording medium having high electromagnetic transfer characteristics.

As the calender processing roll, heat-resistant plastic roll made of epoxy, polyimide, polyamide, polyamideimide, etc. is used. Or, a metal roll may be used.

It is preferable that the magnetic recording medium according to the present invention has surface with such good smoothness that average roughness along the central line of the surface is preferably within the range of 0.1 to 4 nm under the cut-off value of 0.25 mm, or more preferably within the range of 1 to 3 nm. To attain such surface smoothness, calender treatment is performed on the magnetic layer, which is formed by selecting specific types of the ferromagnetic powder and the binder as described above.

The conditions for the calender treatment are as follows: Temperature of calender roll is preferably within the range of 60 to 100° C., or more preferably 70 to 100° C., or most preferably 80 to 100° C. Pressure is preferably within the range of 100 to 500 kg/cm², or more preferably 200 to 450 kg/cm², or most preferably 300 to 400 kg/cm².

The laminated substance processed by curing treatment as described above is cut into the shape as desired.

In the magnetic recording medium obtained as described above, the content of the polytetramethylene glycol is lower than that of the conventional type polyurethane resin. Also, by combining the short-chain diol having cyclic structure or the short-chain diol having branched side chain, it is possible to provide the polyurethane resin containing the polytetramethylene glycol with high breaking extension property. Because the content of the short-chain diol is higher than in the conventional type polyurethane resin, urethane bonding concentration is increased substantially and high glass transition temperature can be attained. This makes it possible to obtain strong and tough coating film capable to endure high-speed sliding operation. When it is applied in the lower layer of a multi-layer type, the polyurethane resin is scarcely deposited on the surface of the upper layer when the coating film is dried, and durability is improved.

(Embodiments)

In the following, detailed description will be given on the features of the present invention referring to examples. In the following, the term "part(s)" means "weight part(s)", and the symbol "%" indicates "weight %".

Synthesis Example 1 of Polyurethane Resin

In a container equipped with reflux condenser and agitator and the air inside the container replaced with nitrogen in advance, the polyester polyol shown in Table 1 and short-chain diol having cyclic structure were dissolved in cyclohexanone at 60° C. under nitrogen stream. Next, di-n-dibutyl tin laurate (60 ppm) was added as catalyst, and this was dissolved for 15 minutes. Further, diphenylenemethane diisocyanate (MDI) was added in the quantity shown in Table 1, and thermal reaction was performed at 90° C. for 6 hours, and a polyurethane resin solution was prepared. Weight average molecular weight and glass transition temperature of the polyurethane prepared are shown in Table 1.

The abbreviations used in Table 1 are as follows:
PTMG: polytetramethylene glycol (Molecular weight 2,000)
HB100: Hydrogenated bisphenol A
BPX-11: Propylene oxide addition product of bisphenol A
DEIS: Ethylene oxide addition product of sulfophthalic acid
PA: Phthalic acid
1,4BD: 1,4-butanediol
TMP: Trimethylolpropane
NPG-HPV: Monoester compound of neopentyl glycol and hydroxypivalic acid
MDI: Diphenylmethane diisocyanate
TDI: Tolylene diisocyanate Synthesis Example 2 of Polyurethane Resin In a container equipped with reflux condenser and agitator and with the air inside the container replaced with nitrogen in advance, the polyester polyol shown in Table 2 and the short-chain diol having a branched side chain were dissolved in cyclohexanone under nitrogen stream. Next, di-n-dibutyl tin laurate (60 ppm) was added as catalyst, and this was dissolved for 15 minutes. Further, diphenylenemethane diisocyanate (MDI) was added in the quantity shown in Table 2, and thermal reaction was performed at 90° C. for 6 hours, and a polyurethane resin solution was prepared. Weight average molecular weight and glass transition temperature of the polyurethane prepared are shown in Table 1.

EXAMPLE A1

Using an open kneader, 100 parts of ferromagnetic alloy powder (composition: Co/Fe 5 atomic %, Y/Fe 6 atomic %, Hc 2,000 Oe; crystallite size 15 nm; BET specific surface area 59 m²/g; longer axis diameter 0.12 μm; acicular ratio 7; σ s 150 emu/g) were pulverized for 10 minutes. Then, this was kneaded with 20 parts (solid) of polyurethane resin 1A and 60 parts of cyclohexanone for 60 minutes. Then, the following compounds were added:

| | |
|---|---|
| Abrasive material (Al₂O₃; particle size 0.3 μm) | 2 parts |
| Carbon black (particle size 40 nm) | 2 parts |
| Methylethylketone/toluene = 1/1 | 200 parts |

TABLE 1

| Type of polyurethane | Polyether polyol | | Short-chain diol having cyclic structure | | | | Diisocyanate (weight %) | Tg (° C.) | Weight average molecular weight |
|---|---|---|---|---|---|---|---|---|---|
| | Type | (weight %) | Type | (weight %) | Type | (weight %) | | | |
| 1A | PTMG | 36 | HB100 | 38 | DEIS | 2 | 24 | 116 | 42000 |
| 1B | ↓ | 58 | ↓ | 8 | ↓ | 2 | 32 | 30 | 45000 |
| 1C | ↓ | 50 | ↓ | 18 | ↓ | 2 | 30 | 50 | 41500 |
| 1D | ↓ | 50 | BPX-11 | 18 | ↓ | 2 | 30 | 90 | 39600 |
| 1E | ↓ | 30 | HB100 | 40 | ↓ | 2 | 28 | 120 | 40500 |
| 1F | ↓ | 65 | ↓ | 10 | ↓ | 2 | 23 | 23 | 42000 |
| 1G | ↓ | 36 | ↓ | 43 | ↓ | 2 | 19 | 128 | 42000 |
| 1H | ↓ | 58 | ↓ | 6 | ↓ | 2 | 34 | 25 | 42300 |
| 1I | PTMG/PA/MDI = 75/12/14 JP(A)01263927 | | | | | | | −30 | 27000 |
| 1J | PTMG/1,4BD/TMP/TDI = 48/13/3/37 JP(B)82060531 | | | | | | | −10 | 34000 |
| 1K | PTMG/NPG-HPV/1,4BD/TDI = 38/25/3/33 JP(A)61190717 | | | | | | | −24 | 36000 |

The mixture was then dispersed in a sand mill for 120 minutes. Then, the following compounds were added:

| | |
|---|---|
| Polyisocyanate (Nippon Polyurethane Co.; Coronate 3041) (solid) | 5 parts |
| Butyl stearate | 2 parts |
| Stearic acid | 1 part |
| Methylethylketone | 50 parts |

Further, the mixture was agitated and mixed for 20 minutes and was filtered using a filter having average pore size of 1 μm, and a magnetic coating material was prepared.

Next, as adhesive layer, polyester resin containing sulfonic acid was coated on the surface of a polyethylene naphthalate support of 10 μm in thickness using a coil bar to have the thickness of 0.1 μm when dried.

Then, the non-magnetic coating material prepared was coated on the non-magnetic support processed by coating in thickness of 2.0 μm, and immediately thereafter, the magnetic coating material for the upper layer was coated to have the thickness of 0.1 μm when dried using a reverse roll by simultaneous multi-layer coating. On the non-magnetic support with the magnetic coating material coated on it, magnetic field orientation was performed using a magnet of 3000 gauss while the magnetic coating material was not yet dried. Further, after drying, calender treatment was performed (speed 100 m/min.; linear pressure 300 kg/cm; temperature 90° C.) by a combination of metal roll-metal roll-metal roll-metal roll-metal roll-metal roll-metal roll. Then, the product was cut off to have width of 6.35 mm, and a magnetic tape was prepared.

EXAMPLES A2 TO A4
and

Comparative Examples A1 to A4

Magnetic tapes of Example A2 to A4 and Comparative examples A1 to A4 were prepared by the same procedure as in Example 1 except that the polyurethane resin 1A was replaced with the polyurethane resin shown in Table 2.

EXAMPLE A5

(Coating Solution for the Upper Layer . . . Magnetic Coating Material of Example A1)
(Preparation of the Non-magnetic Coating Solution for the Lower Layer)

Using an open kneader, 85 parts of $\alpha$-$Fe_2O_3$ (average particle size 0.15 μm; BET specific surface area 52 m$^2$/g; $Al_2O_3$ and $SiO_2$ were present due to surface treatment; pH 6.5 to 8.0) were pulverized for 10 minutes. Then, 7.5 parts of a compound ($SO_3Na=6\times10^{-5}$ eq/g; epoxy=$10^{-3}$ eq/g; Mw=30,000) which was obtained by adding sodium hydroxyethyl sulfonate to copolymer of vinyl chloride/vinyl acetate/glycidyl methacrylate (86:9:5), 10 parts (solid) of the polyurethane resin 1E containing sulfonic acid, and 60 parts of cyclohexanone were kneaded for 60 minutes. Then, the following compound was added:

| | |
|---|---|
| Methylethylketone/cyclohexanone (6/4) | 200 parts | and the mixture was dispersed in a sand mill for 120 minutes. Then, the following compounds were added:

| | |
|---|---|
| Butyl stearate | 2 parts |
| Stearic acid | 1 part |
| Methylethylketone | 50 parts |

After agitating and mixing for 20 minutes, the mixture was filtered using a filter having average pore size of 1 μm, and a non-magnetic coating solution for the lower layer was prepared.

Next, as adhesive layer, polyester resin containing sulfonic acid was coated on the surface of a polyethylene naphthalate support of 10 μm in thickness using a coil bar to have the thickness of 0.1 μm when dried.

Then, the non-magnetic coating material prepared was coated on the non-magnetic support processed by coating in thickness of 2.0 μm, and immediately thereafter, the magnetic coating material for the upper layer was coated to have the thickness of 0.1 μm when dried using a reverse roll by simultaneous multi-layer coating. On the non-magnetic support with the magnetic coating material coated on it, magnetic field orientation was performed using a magnet of 3000 gauss while the magnetic coating material was not yet dried. Further, after drying, calender treatment was performed (speed 100 m/min.; linear pressure 300 kg/cm; temperature 90° C.) by a combination of metal roll-metal roll-metal roll-metal roll-metal roll-metal roll-metal roll. Then, the product was cut off to have width of 6.35 mm, and a magnetic tape was prepared.

EXAMPLE A6

(Preparation of the Coating Solution for the Upper Layer)
The magnetic coating material of Example A1 was used except that the polyurethane resin 1A was replaced with the polyurethane resin 1E.
(Preparation of the Coating Solution for the Lower Layer)
This was prepared by the same procedure as in Example A5 except that the polyurethane resin 1E was replaced with the polyurethane resin 1A.

EXAMPLE A7

A magnetic recording medium was prepared by the same procedure as in Example A5 except that $\alpha$-$Fe_2O_3$ for the lower layer was replaced with titanium oxide (average particle size 0.035 μm; crystallized rutile; $TiO_2$ content 90% or more; surface treatment layer: alumina; BET specific surface area 35 to 42 m$^2$/g; true specific gravity 4.1; pH 6.5 to 8.0).

EXAMPLE A8

A magnetic recording medium was prepared by the same procedure as in Example A6 except that $\alpha$-$Fe_2O_3$ for the lower layer was replaced with titanium oxide (average particle size 0.035 μm; crystallized rutile; $TiO_2$ content 90% or more; surface treatment layer: alumina; BET specific surface area 35 to 42 m$^2$/g; true specific gravity 4.1; pH 6.5 to 8.0).

Comparative Example A5

A magnetic recording medium was prepared by the same procedure as in Example A5 except that the polyurethane resin 1A for the upper layer was replaced with the polyurethane resin 1E.

Comparative Example A6

A magnetic recording medium was prepared by the same procedure as in Example A7 except that the polyurethane resin 1A for the upper layer was replaced with the polyurethane resin 1E.

prepared in accordance with the synthesis example of the polyurethane in Example 1 of JP-A-61190717.

Next, properties of video tapes prepared in Examples A1 to A8 and Comparative examples A1 to A9 were determined in accordance with the measuring methods described below. The results of the measurements are shown in Table 2.

TABLE 2

| | Polyurethane resin | Ra (nm) | Electromagnetic transfer characteristics (dB) | Friction coefficient increase | Output decrease (dB) | Contamination |
|---|---|---|---|---|---|---|
| Example A1 | 1A | 2 | 0.5 | 110 | −0.1 | Very good |
| Example A2 | 1B | 2.1 | 0.5 | 150 | −0.2 | Very good |
| Example A3 | 1C | 1.5 | 0.7 | 120 | −0.2 | Very good |
| Example A4 | 1D | 1.4 | 0.7 | 130 | −0.1 | Very good |
| Example A5 | Upper layer: 1A Lower layer: 1E | 1.6 | 0.8 | 120 | −0.2 | Very good |
| Example A6 | Upper layer: 1E Lower layer: 1A | 1.7 | 0.7 | 140 | −0.3 | Very good |
| Example A7 | Upper layer: 1A Lower layer: 1E | 1.6 | 0.7 | 150 | −0.3 | Very good |
| Example A8 | Upper layer: 1E Lower layer: 1A | 1.7 | 0.7 | 150 | −0.3 | Very good |
| Comparative example A1 | 1E | 2.6 | 0 | 230 | −0.8 | No good |
| Comparative example A2 | 1F | 2.5 | 0.1 | 300 | −1.3 | No good |
| Comparative example A3 | 1G | 2.5 | 0 | 250 | −0.7 | No good |
| Comparative example A4 | 1H | 2.7 | −0.1 | 260 | −0.6 | No good |
| Comparative example A5 | Upper layer: 1E Lower layer: 1E | 2.3 | 0.1 | 260 | −0.6 | No good |
| Comparative example A6 | Upper layer: 1E Lower layer: 1E | 2.4 | 0.1 | 270 | −0.8 | No good |
| Comparative example A7 | 1I | 3.5 | −0.5 | 340 | −1.5 | No good |
| Comparative example A8 | 1J | 3.2 | −0.6 | 310 | −1.1 | No good |
| Comparative example A9 | 1K | 3.3 | −0.7 | 300 | −1.4 | No good |

Comparative Example A7

A magnetic recording medium was prepared by the same procedure as in Example A1 except that the polyurethane resin 1A was replaced with the polyurethane resin 1I prepared in accordance with the synthesis example of the polyurethane in Example 3 of JP-A-1-263927.

Comparative Example A8

A magnetic recording medium was prepared by the same procedure as in Example A1 except that the polyurethane resin 1A was replaced with the polyurethane resin 1J prepared in accordance with the synthesis example of the polyurethane in Example 1 of JP-B-82060531.

Comparative Example A9

A magnetic recording medium was prepared by the same procedure as in Example A1 except that the polyurethane resin 1A was replaced with the polyurethane resin 1K

Synthesis Example 2 of Polyurethane Resin

In a container equipped with reflux condenser and agitator and with the air inside the container replaced with nitrogen in advance, the polyester polyol shown in Table 3 and the short-chain diol having a branched side chain were dissolved in cyclohexanone under nitrogen stream. Next, di-n-dibutyl tin laurate (60 ppm) was added as catalyst, and this was dissolved for 15 minutes. Further, diphenylenemethane diisocyanate (MDI) was added in the quantity shown in Table 3, and thermal reaction was performed at 90° C. for 6 hours, and a polyurethane resin solution was prepared. Weight average molecular weight and glass transition temperature of the polyurethane prepared are shown in Table 3.

TABLE 3

| Type of poly-urethane | Polyether polyol Type | Polyether polyol (weight %) | Short-chain diol having branched side chain Type | Short-chain diol having branched side chain (weight %) | Short-chain diol having branched side chain Type | Short-chain diol having branched side chain (weight %) | Diiso cyanate Q'ty (weight %) | Tg (° C.) | Weight average molecular weight |
|---|---|---|---|---|---|---|---|---|---|
| 2A | PTMG | 36 | Compound A | 40 | DEIS | 2 | 22 | 115 | 41500 |
| 2B | ↓ | 58 | ↓ | 10 | ↓ | 2 | 30 | 30 | 42000 |
| 2C | ↓ | 50 | ↓ | 20 | ↓ | 2 | 28 | 45 | 40500 |
| 2D | ↓ | 50 | Compound B | 20 | ↓ | 2 | 28 | 86 | 39600 |
| 2E | ↓ | 50 | Compound C | 20 | ↓ | 2 | 28 | 87 | 38000 |
| 2F | ↓ | 30 | Compound A | 42 | ↓ | 2 | 26 | 124 | 36500 |
| 2G | ↓ | 65 | ↓ | 12 | ↓ | 2 | 21 | 20 | 40500 |
| 2H | ↓ | 36 | ↓ | 45 | ↓ | 2 | 17 | 124 | 42000 |
| 2I | ↓ | 58 | ↓ | 8 | ↓ | 2 | 32 | 25 | 42300 |
| 2J | PTMG/PA/MDI = 75/12/14 weight % JP(A)01263927 | | | | | | | −30 | 27000 |
| 2K | PTMG/1,4BD/TMP/TDI = 48/13/3/37 weight % JP(B)82060531 | | | | | | | −10 | 34000 |
| 2L | PTMG/NPG-HPV/1,4BD/TDI = 38/25/3/33 weight % JP (A) 61190717 | | | | | | | −24 | 36000 |
| 2M | Polyester polyol A/Compound A/MDI = 34/16/50 weight % JP (A) 06314424 | | | | | | | 20 | 35000 |
| 2N | Polyester polyol B/NPG-HPV/MDI = 70/10/20 weight % JP(A)09044840 | | | | | | | 30 | 36000 |

The abbreviations used in Table 3 are as follows:

PTMG: Polytetramethylene glycol (molecular weight: 2,000)

Compound A: 2-ethyl-2-butyl-1,3-propanediol

Compound B: 2,2-diethyl-1,3-propanediol

Compound C: 2,2-dibutyl-1,3-propanediol

DEIS: Ethylene oxide addition product of sulfo-isophthalic acid.

PA: Phthalic acid 1,4BD: 1,4-butanediol

TMP: Trimethylol propane

NPG-HPV: Monoester compound of neopentyl glycol and hydroxypivalic acid.

MDI: Diphenylmethane diisocyanate

TDI: Tolylene diisocyanate

Polyesterpolyol A: Adipic acid/3-methyl-1,5-pentanediol

Polyesterpolyol B: Terephthalic acid/1,6-naphthalene-dicarboxylic acid/5-Na-sulfo-isophthalic acid/2-methyl-1,3-propanediol

EXAMPLE B1

Using an open kneader, 100 parts of ferromagnetic alloy powder (composition: Cb/Fe 5 atomic %, Y/Fe 6 atomic %, Hc 2,000 Oe; crystallite size 15 nm; BET specific surface area 59 m²/g; longer axis diameter 0.12 µm; acicular ratio 7; σ s 150 emu/g) were pulverized for 10 minutes. Then, this was kneaded with 20 parts (solid) of polyurethane resin 2A and 60 parts of cyclohexanone for 60 minutes. Then, the following compounds were added:

| | |
|---|---|
| Abrasive material (Al₂O₃; particle size 0.3 µm) | 2 parts |
| Carbon black (particle size 40 nm) | 2 parts |
| Methylethylketone/toluene = 1/1 | 200 parts |

The mixture was then dispersed in a sand mill for 120 minutes. Then, the following compounds were added:

| | |
|---|---|
| Polyisocyanate | 5 parts |
| (Nippon Polyurethane Co.; Coronate 3041) | (solid) |
| Butyl stearate | 2 parts |
| Stearic acid | 1 part |
| Methylethylketone | 50 parts |

Further, the mixture was agitated and mixed for 20 minutes and was filtered using a filter having average pore size of 1 µm, and a magnetic coating material was prepared.

Next, as adhesive layer, polyester resin containing sulfonic acid was coated on the surface of a polyethylene naphthalate support of 10 µm in thickness using a coil bar to have the thickness of 0.1 µm when dried.

Then, the non-magnetic coating material prepared was coated on the non-magnetic support processed by coating in thickness of 2.0 µm, and immediately thereafter, the magnetic coating material for the upper layer was coated to have the thickness of 0.1 µm when dried using a reverse roll by simultaneous multi-layer coating. On the non-magnetic support with the magnetic coating material coated on it, magnetic field orientation was performed using a magnet of 3000 gauss while the magnetic coating material was not yet dried. Further, after drying, calender treatment was performed (speed 100 m/min.; linear pressure 300 kg/cm; temperature 90° C.) by a combination of metal roll-metal roll-metal roll-metal roll-metal roll-metal roll-metal roll. Then, the product was cut off to have width of 6.35 mm, and a magnetic tape was prepared.

EXAMPLE B2 TO B4 and

Comparative Examples B1 to B4

A magnetic recording medium was prepared for each of Examples B2 to B4 and Comparative examples B1 to B4 by the same procedure as in Example B1 except that the polyurethane resin 2A was replaced with the polyurethane resin shown in Table 3.

Also, preparation was performed for each of Examples B2 to B5 and Comparative examples B1 to B4 by the same procedure as in Example B1 except that the polyurethane resin 2A was replaced with the polyurethane resin shown in Table 3.

EXAMPLE 6
(Preparation of Magnetic Solution for the Upper Layer)
(Preparation of the Solution for the Lower Layer)

The magnetic coating material of Example B1 was used.
(Preparation of the Non-magnetic Coating Solution for the Lower Layer)

Using an open kneader, 85 parts of $\alpha$-$Fe_2O_3$ (average particle size 0.15 $\mu$m; BET specific surface area 52 $m^2$/g; $Al_2O_3$ and $SiO_2$ were present due to surface treatment; pH 6.5 to 8.0) were pulverized for 10 minutes. Then, 7.5 parts of a compound ($SO_3Na=6\times10^{-5}$ eq/g; epoxy=$10^{-3}$ eq/g; Mw=30,000) which was obtained by adding sodium hydroxyethyl sulfonate to copolymer of vinyl chloride/vinyl acetate/glycidyl methacrylate (86:9:5), 10 parts (solid) of the polyurethane resin 1F containing sulfonic acid, and 60 parts of cyclohexanone were kneaded for 60 minutes. Then, the following compound was added:

| Methylethylketone/cyclohexanone (6/4) | 200 parts |
| --- | --- | and the mixture was dispersed in a sand mill for 120 minutes. Then, the following compounds were added:

| Butyl stearate | 2 parts |
| --- | --- |
| Stearic acid | 1 part |
| Methylethyketone | 50 parts |

After agitating and mixing for 20 minutes, the mixture was filtered using a filter having average pore size of 1 $\mu$m, and a non-magnetic coating solution for the lower layer was prepared.

Next, as adhesive layer, polyester resin containing sulfonic acid was coated on the surface of a polyethylene naphthalate support of 10 $\mu$m in thickness using a coil bar to have the thickness of 0.1 $\mu$m when dried.

Then, the non-magnetic coating material prepared was coated on the non-magnetic support processed by coating in thickness of 2.0 $\mu$m, and immediately thereafter, the magnetic coating material for the upper layer was coated to have the thickness of 0.1 $\mu$m when dried using a reverse roll by simultaneous multi-layer coating. On the non-magnetic support with the magnetic coating material coated on it, magnetic field orientation was performed using a magnet of 3000 gauss while the magnetic coating material was not yet dried. Further, after drying, calender treatment was performed (speed 100 m/min.; linear pressure 300 kg/cm; temperature 90° C.) by a combination of metal roll-metal roll-metal roll-metal roll-metal roll-metal roll-metal roll. Then, the product was cut off to have width of 6.35 mm, and a magnetic tape was prepared.

EXAMPLE B7
(Preparation of Magnetic Solution for the Upper Layer)

The magnetic coating solution of Example B1 was used except that the polyurethane resin 2A was replaced with the polyurethane resin 2F.

(Preparation of the Solution for the Lower Layer)

A magnetic recording medium was prepared by the same procedure as in Example B6 except that the polyurethane resin 2F was replaced with the polyurethane resin 2A.

EXAMPLE B8

A magnetic recording medium was prepared by the same procedure as in Example B6 except that $\alpha$-$Fe_2O_3$ for the lower layer was replaced with titanium oxide (average particle size 0.035 $\mu$m; crystallized rutile; $TiO_2$ content 90% or more; surface treatment layer: alumina; BET specific surface area 35 to 42 $m^2$/g; true specific gravity 4.1; pH 6.5 to 8.0).

EXAMPLE B9

A magnetic recording medium prepared by the same procedure as in Example B7 except that $\alpha$-$Fe_2O_3$ for the lower layer was replaced with titanium oxide (average particle size 0.035 $\mu$m; crystallized rutile; $TiO_2$ content 90% or more; surface treatment layer: alumina; BET specific surface area 35 to 42 $m^2$/g; true specific gravity 4.1; pH 6.5 to 8.0).

Comparative Example B5

A magnetic recording medium was prepared by the same procedure as in Example B6 except that the polyurethane resin 2A for the upper layer was replaced with the polyurethane resin 2F.

Comparative Example B6

A magnetic recording medium was prepared by the same procedure as in Example B8 except that the polyurethane resin 2A for the upper layer was replaced with the polyurethane resin 2F.

Comparative Example B7

A magnetic recording medium was prepared by the same procedure as in Example 1 except that the polyurethane resin 2A was replaced with the polyurethane resin 2J prepared in accordance with the synthesis example of the polyurethane in Example 3 of JP-A-01263927.

Comparative Example B8

A magnetic recording medium was prepared by the same procedure as in Example B1 except that the polyurethane resin 2A was replaced with the polyurethane resin 2K prepared in accordance with the synthesis example of the polyurethane in Example 1 of JP-B-82060531.

Comparative Example B9

A magnetic recording medium was prepared by the same procedure as in Example 1 except that the polyurethane resin 2A was replaced with the polyurethane resin 2L prepared in accordance with the synthesis example of the polyurethane in Example 1 of JP-A-61190717.

Comparative Example B10

A magnetic recording medium was prepared by the same procedure as in Example B1 except that the polyurethane resin 2A was replaced with the polyurethane resin 2M prepared in accordance with the synthesis example of the polyurethane in Example 1 of JP-A-06031424.

Comparative Example B11

A magnetic recording medium was prepared by the same procedure as in Example B1 except that the polyurethane resin 2A was replaced with the polyurethane resin 2N prepared in accordance with the synthesis example of the polyurethane in Example 1 of JP-A-0944840.

Next, properties of video tapes in each of Examples B1 to B9 and Comparative examples B1 to B11 were determined according to the measuring methods given below. The results of the measurements are shown in Table 4.

friction coefficient after 100 passes was given with the friction coefficient at 1st pass as 100.

$$\text{Friction coefficient} = 1/\pi \cdot \ln(T2/T1)$$

As described above, according to the polyurethane resin of the present invention, it is possible to eliminate increase of friction coefficient caused by repeated sliding operation,

TABLE 4

| | Polyurethane resin | Ra (nm) | Electro-magnetic transfer characteristics (dB) | Friction coefficient increase | Output decrease (dB) | Contamination |
|---|---|---|---|---|---|---|
| Example A1 | 2A | 2.1 | 0.5 | 110 | −0.2 | Very good |
| Example A2 | 2B | 2.1 | 0.5 | 150 | −0.2 | Very good |
| Example A3 | 2C | 1.5 | 0.7 | 120 | −0.2 | Very good |
| Example A4 | 2D | 1.4 | 0.6 | 130 | −0.1 | Very good |
| Example A5 | 2E | 1.7 | 0.5 | 140 | −0.3 | Very good |
| Example A6 | Upper layer: 2A Lower layer: 2F | 1.6 | 0.8 | 120 | −0.2 | Very good |
| Example A7 | Upper layer: 2F Lower layer: 2A | 1.6 | 0.7 | 140 | −0.3 | Very good |
| Example A8 | Upper layer: 2A Lower layer: 2F | 1.6 | 0.7 | 150 | −0.3 | Very good |
| Example A9 | Upper layer: 2F Lower layer: 2A | 1.7 | 0.7 | 150 | −0.3 | Very good |
| Comparative example B1 | 2F | 2.7 | 0 | 240 | −0.8 | No good |
| Comparative example B2 | 2G | 2.5 | 0.1 | 290 | −0.7 | No good |
| Comparative example B3 | 2H | 2.7 | 0 | 250 | −0.7 | No good |
| Comparative example B4 | 2I | 2.7 | −0.1 | 260 | −0.5 | No good |
| Comparative example B5 | Upper layer: 2F Lower layer: 2F | 2.4 | 0.1 | 260 | −0.6 | No good |
| Comparative example B6 | Upper layer: 2F Lower layer: 2F | 2.4 | 0.1 | 280 | −0.7 | No good |
| Comparative example B7 | 2J | 3.5 | −0.5 | 340 | −1.5 | No good |
| Comparative example B8 | 2K | 3.3 | −0.6 | 310 | −1.1 | No good |
| Comparative example B9 | 2L | 3.5 | −0.6 | 300 | −1.6 | No good |
| Comparative example B10 | 2M | 3.4 | −0.6 | 280 | −1.6 | No good |
| Comparative example B11 | 2N | 3.3 | −0.7 | 240 | −1.4 | No good |

[Measuring Methods]
(1) Electromagnetic Transfer Characteristics

Using a digital video tape recorder (manufactured by Matsushita Electric; NV-BJ1), a signal with recording wavelength of 0.5 $\mu$m was recorded on a specimen tape, and the signal was then reproduced. Reproduction output of the signal recorded on the standard tape (Comparative example 1) was regarded as 0 dB, and relative reproducing output of the tape was measured.

(2) Ra

By optical interference method using digital optical profimeter (manufactured by WYKO), average surface roughness at the central line was determined under the condition of cut-off value of 0.25 mm, and this was regarded as Ra.

(3) Friction Coefficient Increase

A tape of 6.35 mm in width was brought into contact with a stainless steel bar of 4 mm in diameter by tensile strength of 20 g (T1) at a wind-up angle of 180°, and tensile strength (T2) was measured when the tape was run by 100 passes for a length of 100 mm at a rate of 14 mm/sec. Friction coefficient was obtained by the equation given below. The to have smooth tape surface, and to improve electromagnetic transfer characteristics. Also, it is possible to increase the strength at the surface of the coating film, and to improve head contamination and output decrease during repeated running operation.

What we claim is:

1. A magnetic recording medium, comprising at least one magnetic layer, said at least one magnetic layer containing dispersed therein ferromagnetic powder and a binder, and a non-magnetic support for said at least one magnetic layer, wherein said at least one magnetic layer is located on said non-magnetic support, said binder comprises a polyurethane resin and a diisocyanate, said polyurethane resin comprises polytetramethylene glycol and a short-chain diol having a branched side chain containing two or more carbon atoms, said polytetramethylene glycol is contained in said polyurethane resin in an amount of 40 to 60 weight %, said short-chain diol is contained in said polyurethane resin in an amount of 10 to 40 weight %, said diisocyanate contained in the amount of 22 to 32% by weight, said polyurethane resin has a glass transition temperature within the range of 30° C. to 120° C. and contains a polar group in the amount of $1\times10^{-5}$ eq/g to $2\times10^{-4}$ eq/g, and the short-chain diol having a branched side chain containing two or more carbon atoms is selected from the group consisting of 2,2-diethyl-1,3-propanediol, 2-ethyl-2-butyl-1,3-propanediol, 2-ethyl-2-propyl-1,3-propanediol, 2,2-dipropyl-1,3-propanediol, 2-methyl-2-propyl-1,3-propanediol, 2,2-dibutyl-1,3-propanediol and mixtures thereof.

2. A magnetic recording medium according to claim 1, wherein said ferromagnetic powder has iron as a main component thereof, and said ferromagnetic powder contains yttrium and has a Y/Fe ratio of 0.5 to 10 atomic %.

3. A magnetic recording medium, comprising a lower layer, said lower layer having dispersed therein ferromagnetic powder or inorganic powder and a binder, and a non-magnetic support, said lower layer being located on said non-magnetic support, and at least one magnetic layer containing dispersed therein ferromagnetic powder and a binder, wherein at least one of said binder in the lower layer or said binder in the magnetic layer contains a polyurethane resin and a diisocyanate, wherein said polyurethane resin comprises a polytetramethylene glycol and a short-chain diol having a branched side chain containing two or more carbon atoms, said tetramethylene glycol is contained in said polyurethane resin in an amount of 40 to 60 weight %, said short-chain diol is contained in said polyurethane resin in amount of 10 to 40 weight %, said diisocyanate contained in the amount of 22 to 32% by weight, said polyurethane resin has a glass transition temperature within the range of 30° C. to 120° C. and contains a polar group in the amount of $1\times10^{-5}$ eq/g to $2\times10^{-4}$ eq/g, and the short-chain diol having a branched side chain containing two or more carbon atoms is selected from the group consisting of 2,2-diethyl-1,3-propanediol, 2-ethyl-2-butyl-1,3-propanediol, 2-ethyl-2-propyl-1,3-propanediol, 2,2-dipropyl-1,3-propanediol, 2-methyl-2-propyl-1,3-propanediol, 2,2-dibutyl-1,3-propanediol and mixtures thereof.

4. A magnetic recording medium according to claim 3, wherein said ferromagnetic powder has iron as a main component thereof, and said ferromagnetic powder contains yttrium and has a Y/Fe ratio of 0.5 to 10 atomic %.

* * * * *